United States Patent [19]

Waters

[11] Patent Number: 5,279,636
[45] Date of Patent: Jan. 18, 1994

[54] GLASS ARTICLE INSPECTION AND REJECTION APPARATUS

[75] Inventor: Ronald L. Waters, Mansfield, Pa.

[73] Assignee: GTE Products Corporation, Danvers, Mass.

[21] Appl. No.: 967,360

[22] Filed: Oct. 28, 1992

[51] Int. Cl.$^5$ .......................... C03B 9/12; B07C 5/00
[52] U.S. Cl. .......................... 65/158; 65/162; 65/261; 65/DIG. 13; 209/577
[58] Field of Search .......... 65/29, 158, 160, 162, 65/228, 262, 264, 301, 67, 184, 112, DIG.; 209/577, 606

[56] References Cited

U.S. PATENT DOCUMENTS

| | | | |
|---|---|---|---|
| 1,776,556 | 9/1930 | Gray et al. | 65/174 |
| 2,091,494 | 8/1937 | Snyder | 65/177 |
| 3,113,013 | 12/1963 | Anderson et al. | 65/29 |
| 3,729,302 | 4/1973 | Heaton | 65/177 |
| 3,877,915 | 4/1975 | Mylchreest et al. | 65/29 |
| 3,894,454 | 7/1975 | Reilly et al. | 82/48 |
| 3,998,331 | 12/1976 | Reilly et al. | 209/577 |
| 4,152,134 | 5/1979 | Dowling et al. | 65/DIG. 13 |
| 4,402,721 | 9/1983 | Ericson et al. | 65/29 |
| 4,431,436 | 2/1984 | Lulejian | 65/DIG. 13 |
| 4,614,531 | 9/1986 | Bishop et al. | 65/DIG. 13 |
| 4,675,042 | 6/1987 | Taddri-Contreras et al. | 65/DIG. 13 |
| 4,691,830 | 9/1987 | Ahl et al. | 65/29 |
| 4,762,544 | 8/1988 | Davey | 65/29 |

Primary Examiner—W. Gary Jones
Assistant Examiner—Steven P. Griffin
Attorney, Agent, or Firm—William H. McNeill

[57] ABSTRACT

An apparatus and method are provided for automatically inspecting and rejecting glass articles during the continuous manufacture thereof. In particular, an optical pyrometer is provided for measuring the top of each glass article and generating signals representative of the residual temperature thereof. A computer includes software which processes the temperature signals and generates actuating signals if the temperature does not fall within a range of predetermined temperature setpoints. Generation of such actuating signals actuates a hammer which removes each defective glass article.

5 Claims, 3 Drawing Sheets

GLASS ARTICLE INSPECTION AND REJECTION APPARATUS

BACKGROUND OF INVENTION

The present invention relates to an apparatus and method of automatically inspecting and rejecting glass articles during their manufacture. Such apparatus and method may be used on a variety of different types of glass forming machines provided that the glass article produced is suspended from a fixed point after it leaves the mold; retains some residual heat from the molding operation; and that the top of the glass article is visible. The present invention is particularly useful during the manufacture of hollow glass articles on what is commonly referred to as a glass ribbon machine. In a preferred application, the present invention relates to automatically inspecting incandescent lamp envelopes produced on a ribbon machine and rejecting such envelopes if they are too short or their tops are too thin or too thick.

Glass ribbon machines are well known in the art, one of the earliest being described in U.S. Pat. No. 1,790,397 issued to W. J. Woods et al., and incorporated herein by reference. Such glass ribbon forming machines typically provide for formation of a stream of molten glass into a ribbon of glass which is laid upon an endless chain of orifice plates. Such endless chain and ribbon of glass supported thereon are conveyed in a linear manner through various process steps the last of which involves severing each hollow glass article from the linearly travelling ribbon of glass. In the manufacture of incandescent lamp envelopes, hollow glass envelopes so produced are separated from the linearly travelling ribbon of glass and subjected to further process steps including cleaning and treatment of the interior of each envelope, insertion of the lamp element and sealing of the envelope.

Other known ribbon forming machines include U.S. Pat. No. 1,833,284 issued to Gray, U.S. Pat. No. 3,647,410 issued to Heaton et al. and U.S. Pat. Nos. 3,642,461 and 3,775,084 issued to Heaton, each incorporated herein by reference.

The operation of a ribbon machine to produce lamp envelopes or bulbs is a high speed process typically providing for the production of in excess of one thousand bulbs per minute. Due to such high speed, bulb inspection is usually done on a sampling basis after manufacture of the bulbs and before further processing thereof. For example, in one known inspection technique, bulb sampling is done manually, the bulbs selected being gauged by hand. If any of the bulbs are too short or have tops which are too thick or too thin, all of the bulbs coming down the production line are rejected until another test is conducted which indicates that there are no defective bulbs. Such an inspection process is costly, resulting in scrapping the good as well as the defective bulbs produced between such tests. In addition to adding to manufacturing costs, most of the bulbs are shipped to the customer without being inspected; that is, when a test is conducted, if the test sample results in no defective bulbs, all of the bulbs which come down the production line are further processed and shipped to customers until such time as a test is conducted which indicates that there are defective bulbs.

It is believed that at least one bulb manufacturer using the ribbon forming method inspects the bulbs by means of a laser and detector apparatus for detecting and rejecting short bulbs. However, such system is not believed to be effective in detecting and rejecting bulbs having tops which are too thin or too thick.

It is also known to use a blank length detector to inspect for short bulbs on a ribbon machine. In particular, a line scan camera is provided to detect the length of the blank. However, the effectiveness of this technique is limited in that a short bulb is not always caused by a short blank. In addition, this system is also not effective in detecting and rejecting bulbs having tops which are too thin or too thick.

It is an object of this invention to provide an improved apparatus and method of automatically inspecting glass articles during their manufacture.

It is also an object to provide an apparatus and method of automatically inspecting hollow glass articles during their manufacture on a glass ribbon machine to determine whether any of such hollow glass articles are too short or have tops which are too thin or too thick.

It is a still further object to provide an apparatus and method of automatically inspecting each hollow glass article produced by a glass ribbon machine and automatically rejecting any such hollow glass article which is too short or has a top which is too thin or too thick.

It is also an object to provide an apparatus and method of automatically inspecting and rejecting glass articles, during their manufacture, which is not labor intensive.

It is a further object to provide an apparatus and method of automatically inspecting and rejecting glass articles during their manufacture without rejecting the good glass articles along with the defective glass articles.

It is yet another object to provide an apparatus and method of automatically inspecting and rejecting hollow glass articles during their manufacture on a glass ribbon machine while such hollow glass articles are still on the ribbon of glass.

SUMMARY OF THE INVENTION

This invention achieves these and other objects by providing first means for measuring the residual temperature of a top of each glass article produced, in an apparatus for producing glass articles which are suspended from a fixed point and include a top which is visible, and then generating signals representative of such temperature. Second means is provided for removing select glass articles in response to receipt of actuating signals. Third means electrically connected between the first means and the second means is provided for receiving the signals representative of temperature and selectively generating the actuating signals in response thereto. A method is also provided.

BRIEF DESCRIPTION OF THE DRAWINGS

This invention may be clearly understood by reference to the attached drawings in which.

DESCRIPTION OF THE PREFERRED EMBODIMENT

Figure 1:
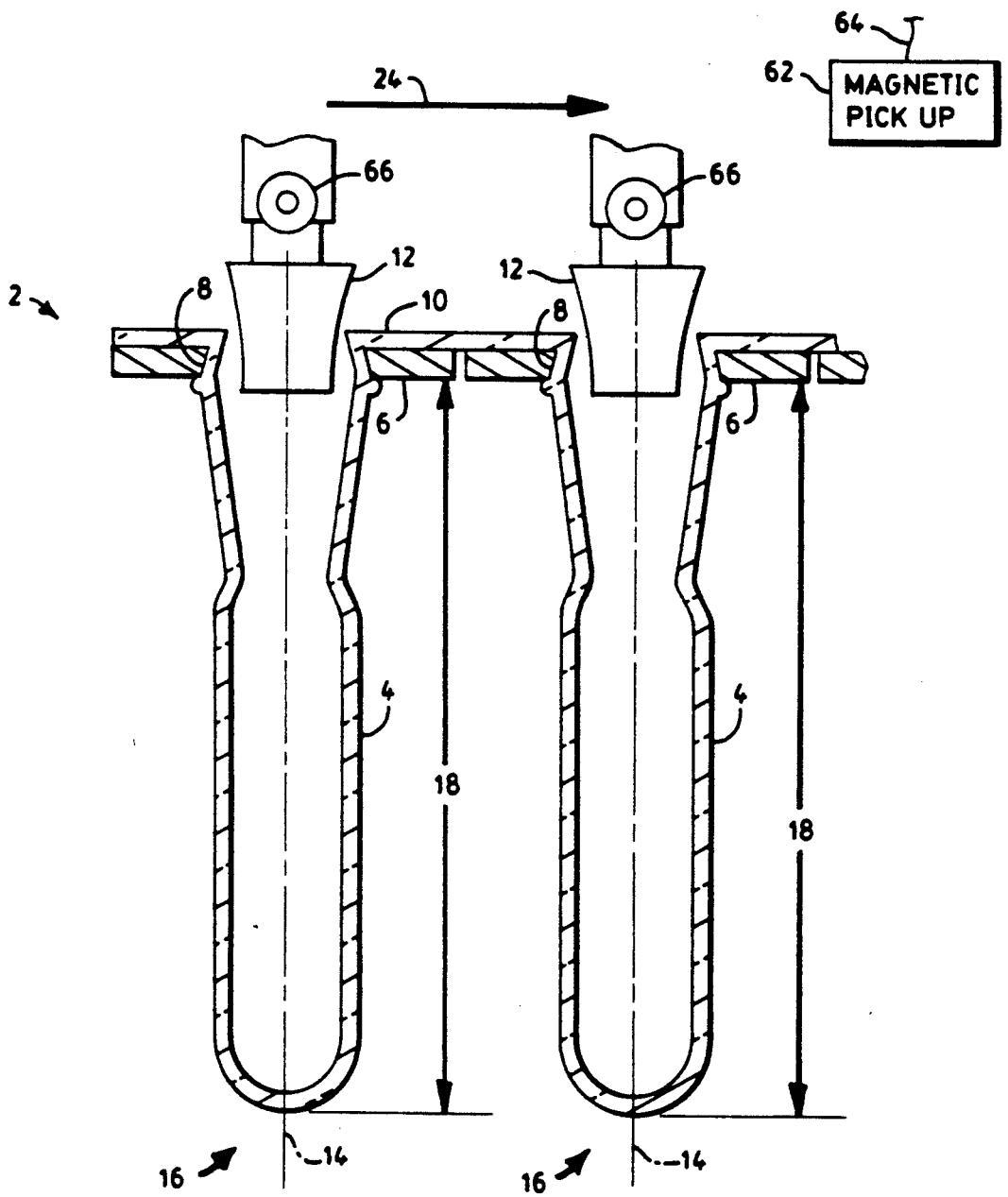
FIG. 1 is a schematic elevational view of a portion of a glass ribbon machine including an embodiment of the present invention which includes a magnetic pickup.

The embodiment of this invention which is illustrated in the drawings is particularly suited for achieving the objects of this invention. FIG. 1 depicts a glass ribbon machine 2 for blow molding hollow glass articles 4 and includes a horizontally disposed moving plate conveyer made up of orifice plates 6 each having a vertical orifice 8. The several orifices 8 are equally spaced horizontally along the conveyer. The conveyer supports a ribbon of plastic, formable glass 10 thereon. Means 12 is disposed above each orifice plate 6 for blow molding the glass to form each hollow glass article 4. Each hollow glass article 4 extends from a respective orifice plate 6 in a direction of a vertical axis 14 which is coincident with the vertical axis of a vertical orifice 8. Each hollow glass article 4 has a top 16 located a distance 18 from a respective orifice plate 6. Such apparatus is well known in the art as noted above and therefore will not be explained in greater detail.

Figure 2:
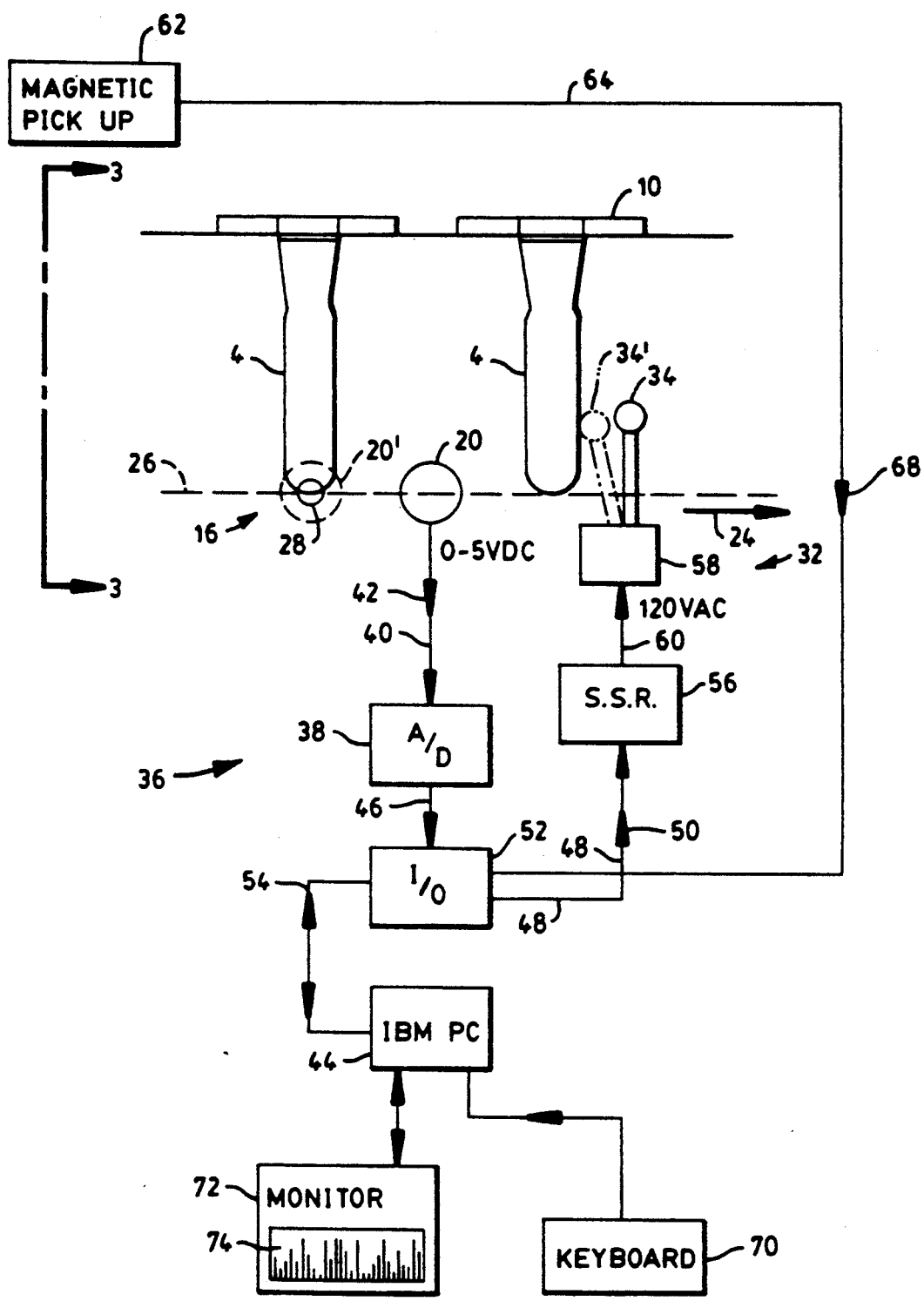
FIG. 2 is a schematic view of the present invention.
Figure 3:
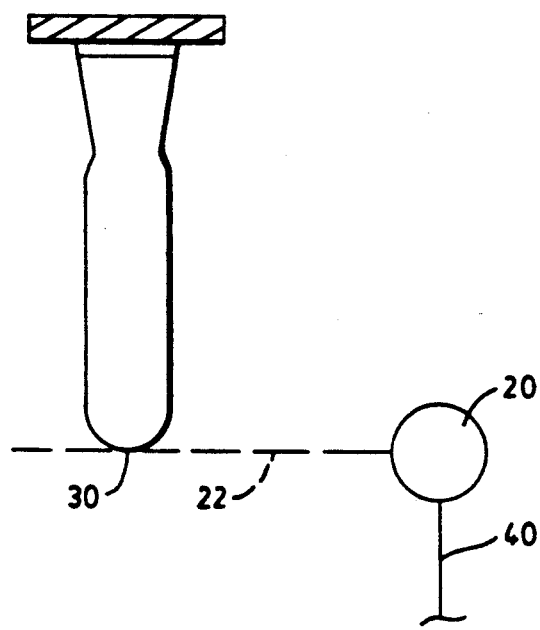
FIG. 3 is a partial view of FIG. 2 taken along line 3—3.

FIGS. 2 and 3 depict that location on a typical glass ribbon machine where the hollow glass articles 4 have been completely fabricated but not yet severed from the linearly travelling ribbon of glass 10 for further processing. At such location, means are provided for measuring the residual temperature of the top 16 of each hollow glass article 4 and generating signals representative of such temperature. In the preferred embodiment such measuring and generating means is in the form of an optical pyrometer 20 such as, for example, model no. FP20 manufactured by Land Infrared, Ltd., of Dronfield, England. Preferably, the optical pyrometer 20 is located at 20' but has been moved to the right in FIG. 2 to clarify the drawing. Optical pyrometer 20 is sighted along sight line 22 which is perpendicular to the direction of travel of the horizontally moving plate conveyer, such direction of travel being designated 24. Pyrometer 20 is also sighted horizontally relative to the top 16 of the hollow glass article 4 as shown at line 26 of FIG. 2. By so positioning the pyrometer 20, a pyrometer spot 28 is provided upon the top 16 of the hollow glass articles 4, a line drawn through the center of spot 28 being tangent to the top 16 as depicted at 30 in FIG. 3. In the preferred embodiment, the pyrometer 20 will have a diameter positioned relative to the hollow glass article 4 such that the spot 28 will be in the range of 0.3 inches to 0.75 inches.

In the embodiment depicted in FIGS. 2 and 3 means is provided for selectively removing a hollow glass article 4 in response to an actuating signal as described in more detail herein. In the preferred embodiment such removing means is in the form of a typical air hammer 32 which includes a head 34 which is actuated to contact a hollow glass Article 4, in response to the actuating signals, as depicted in phantom lines at 34'. Such actuation of head 34 is effective in removing such hollow glass article 4 off of the ribbon machine. Such air hammers are known and have previously been used to monitor individual molds.

In the embodiment depicted in FIG. 2, means is electrically connected between the measuring and generating means and the removing means for receiving the signals representative of the temperature of the heated top of a hollow glass article and generating the actuating signals in response thereto. For example, such receiving and generating means is depicted at 36 as including an analog to digital converter 38 having an input electrically connected to the optical pyrometer 20 by means of conductor 40 for receiving signals 42 representative of the temperature of the heated top of a hollow glass article. A computer 44 such as an IBM PC is also provided having an input electrically connected to an output of the analog to digital converter 38 by means of conductor 46, and an output electrically connected to an input of the air hammer 32 by means of conductor 48 for carrying the actuating signals 50 to the air hammer. To this end an input/output (I/O) card 52 is electrically connected to computer 44 in a known manner by conductors represented at 54, conductors 46, 48 being electrically connected to I/O card 52.

In the preferred embodiment, actuating signals 50 are fed to a solid state relay 56 which actuates a solenoid 58 through conductor 60 to actuate hammer head 34 as described herein.

The reading by the computer 44 of the signal 42 generated by the optical pyrometer 20 is actuated by means electrically connected to computer 44 for confirming that a hollow-glass article is in the proximity of the optical pyrometer and juxtaposed relative thereto such that pyrometer spot 28 is located at head 16 as described herein. When the presence of each hollow glass article is so confirmed, software in the computer is triggered to read the signals 42 representative of the temperature of the top of such hollow glass article and to generate the actuating signals 50 if the temperature being measured is above a predetermined high setpoint or below a predetermined low setpoint. In the preferred embodiment such confirming means is a magnetic pickup 62 electrically connected to computer 48 through I/O 52 by means of conductor 64. The location of the magnetic pickup 62 is preferably upstream of the optical pyrometer. In particular, in the preferred embodiment magnetic pickup 62 is positioned to produce a pulse every time a lamp envelope is made, such pulse triggering the software as noted herein to read the signals 42 representative of the temperature of the top of 16 of a lamp envelope located further downstream in the presence of the optical pyrometer. By producing a pulse each time a lamp envelope is made, it is assured that each lamp envelope will be inspected, as described herein, during the continuous manufacturing process.

The operation of the embodiment of the present invention depicted in the drawings will now be described with reference to the manufacture of hollow glass articles 4 in the form of incandescent lamp envelopes. Such incandescent lamp envelopes are continuously produced in a known manner upon a glass ribbon machine 2. The optical pyrometer 20 is located at a position upon the glass ribbon machine where fabrication of the lamp envelope is complete. The optical pyrometer 20 is sighted along sight line 22 which is perpendicular to the direction of travel 24 of the lamp envelopes 4, and horizontally relative to the top 16 of each lamp envelope as shown at line 26 and produces a pyrometer spot having a diameter in the range of 0.3 and 0.75 inches, a line drawn through the center of spot 28 being tangent to the top 16 of the lamp envelope as shown at 30 in FIG. 3. Optical pyrometer 20 measures the temperature at the top 16 of the lamp and generates a signal 42 representative of such temperature. Signal 42 is transmitted as a DC voltage to the analog to digital converter 38 which is a plug-in I/O circuit card 52 for the IBM compatible computer 44.

As depicted in FIG. 1, each blow molding means 12 is in the form of a nozzle which is guided by rollers 66 upon tracks (not shown) in the usual manner. The magnetic pickup 62 is positioned upon the glass ribbon machine in proximity to the path followed by rollers 66 such that the magnetic pickup senses the passage of each such roller and therefore the presence of each hollow glass article. Upon, sensing the presence of a roller 66, the magnetic pickup produces a signal 68 which is fed to computer 44 through I/O card 52 to trigger the software in the computer to read the signals 42 representative of the temperature of the top 16 of a hollow glass article 4 further down the line in proximity to the optical pyrometer and to generate actuating signals 50 if the temperature of such hollow glass article is above a predetermined high setpoint or below a predetermined low setpoint. Assuming one of these two conditions exists, actuating signals 50 will actuate solid state relay 56 to actuate solenoid 58 to cause hammer head 34 to remove such hollow glass article.

Figure 4:
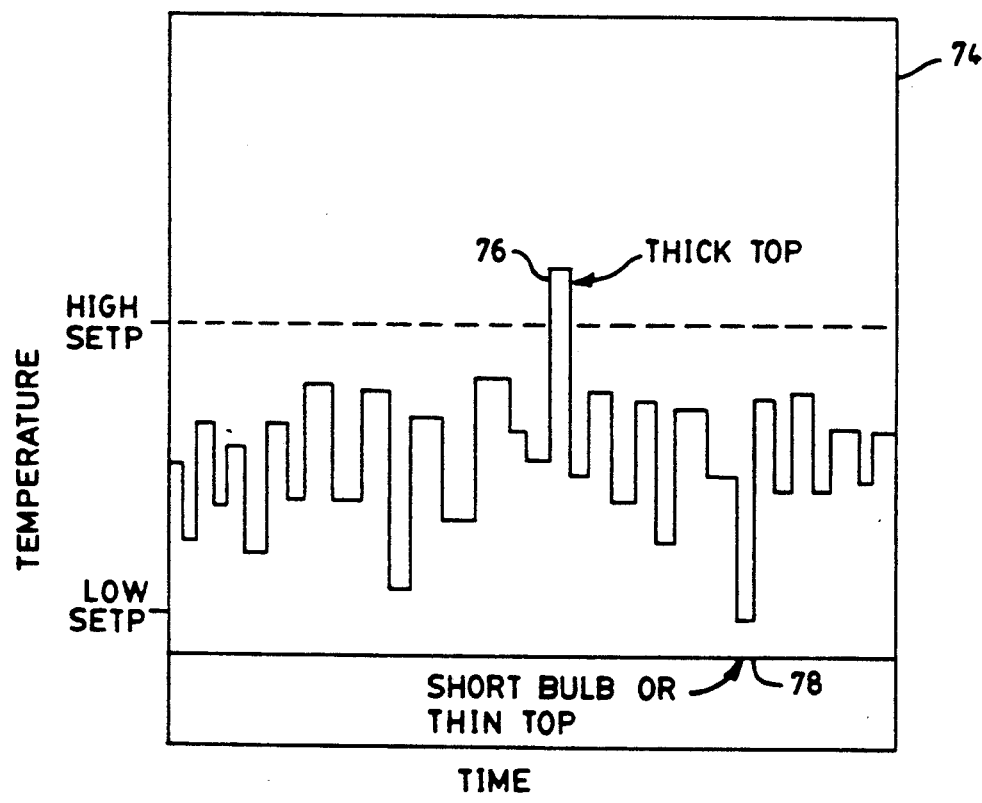
FIG. 4 is a graphical depiction of the measurement of peak temperature relative to a predetermined high and low setpoint.

It is assumed that suitable power supplies are provided for all of the components described herein. High and low setpoints can be selected by the operator and programmed into computer 44 by means of the usual keyboard 70. In this manner, predetermined high and low setpoints may be selected as desired. A monitor 72 may also be provided to graphically depict whether the peak temperature measured is above or below the high setpoint and low setpoint, respectively. FIG. 4 depicts one example of such a graphical depiction 74. In graphical depiction 74, bar 76 represents the peak temperature as being above the high setpoint which, as noted, is indicative of a top 16 which is too thick. Bar 78 represents the peak temperature as being below the low setpoint which, as noted, is indicative of a top 16 which is too thin or a bulb 4 which is too short.

In considering the operation of optical pyrometer 20, the length of the lamp envelope will be one factor affecting the nature of the temperature signals 42. In particular, the shorter length of the lamp envelope, the colder will be the measured temperature. For example, if the lamp envelope is so short that it passes above the sight path altogether, the pyrometer will see nothing and the temperature will be the lowest. The thickness of the top of the lamp envelope will be another factor affecting the nature of temperature signals 42. When a lamp envelope with a thin top passes in the line of sight of the pyrometer such envelope will be seen as a cold envelope since thin glass having less mass cools faster than thick glass. When a lamp envelope with a thick top passes in the line of sight of the pyrometer it will be seen as a hot envelope since thick glass having more mass cools slower than thin glass. Upon triggering of the software by signals 68 produced by the magnetic pickup 62, the computer reads the temperature which is represented by signals 42. If the peak envelope temperature is below the preselected low setpoint, the bulb will be rejected by the computer for being too short or having a top which is too thin. If the peak envelope temperature is above the preselected high setpoint, the envelope will be rejected by the computer for having a thick top. As noted, rejection is effected by turning on the solid state relay 56 in response to actuating signals 50 to thereby actuate hammer head 34 to contact the envelope and remove it from the ribbon machine.

The software used in the computer may provide fixed thresholds for temperature or varying thresholds for temperature. With a fixed threshold, if the peak temperature of the envelope being inspected is more or less than the fixed reject threshold it will be rejected. A drawback of this approach is that if the operator of the ribbon machine makes a change on the machine which affects the envelope temperature, then the temperature thresholds may have to be changed. With a varying threshold, the reject thresholds may be automatically calculated based upon average bulb temperature. In this manner, compensation of the reject thresholds for changes in envelope temperature is automatically provided.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. In an apparatus for blow molding hollow glass articles comprising a horizontally disposed moving plate conveyer made up of orifice plates each having a vertical orifice, said orifice plates moving in a direction of travel, the vertical orifices being equally spaced horizontally along the conveyer, and supporting a ribbon of plastic, formable glass thereon, and means disposed above said orifice plates for blow molding said glass to form said hollow glass articles, each hollow glass article extending from a plate in a direction of a vertical axis which is coincident with a vertical axis of said vertical orifice and having a top located a distance from said plate, wherein the improvement comprises:
   means for measuring the residual temperature of said top of said hollow glass article and generating signals representative of said temperature;
   means for selectively removing a select hollow glass article in response to receipt of actuating signals; and
   means electrically connected between said measuring and generating means and said removing means for receiving said signals representative of said temperature and selectively generating said actuating signals in response thereto, said measuring and generating means comprising an optical pyrometer, said optical pyrometer being sighted perpendicularly to said direction of travel of said horizontally moving plate conveyer and horizontally relative to said top of said hollow glass article to provide a pyrometer spot upon said top of said hollow glass articles, and wherein a line drawn through a center of said pyrometer spot is tangent to said top of said hollow glass article.

2. The apparatus of claim 1 wherein said pyrometer spot has a diameter and said diameter is in the range of 0.3 inches to 0.75 inches.

3. The apparatus of claim 2 wherein said signals representative of said temperature are in the form of DC voltage.

4. In an apparatus for blow molding hollow glass articles comprising a horizontally disposed moving plate conveyer made up of orifice plates each having a vertical orifice, said orifice plates moving in a direction of travel, the vertical orifices being equally spaced horizontally along the conveyer, and supporting a ribbon of plastic, formable glass thereon, and means disposed above said orifice plates for blow molding said glass to form said hollow glass articles, each hollow glass article extending from a plate in a direction of a vertical axis which is coincident with a vertical axis of said vertical orifice and having a top located a distance from said plate, wherein the improvement comprises:

means for measuring the residual temperature of said top of said hollow glass article and generating signals representative of said temperature;

means for selectively removing a select hollow glass article in response to receipt of actuating signals; and means electrically connected between said measuring and generating means and said removing means for receiving said signals representative of said temperature and selectively generating said actuating signals in response thereto, said receiving and generating means including an analog to digital converter having an input electrically connected to said measuring and generating means for receiving said signals representative of said temperature, and an output, and a computer having an input and an output, said input of said computer being electrically connected to said output of said analog to digital converter, and said output of said computer being electrically connected to an input of said removing means for carrying said actuating signals to said removing means, said apparatus further including sensing means electrically connected to said computer for sensing each hollow glass article to trigger software in said computer to read said signals representative of said temperature of said top of said hollow glass article and to generate said actuating signals if said temperature is above a predetermined high setpoint or below a predetermined low setpoint, said sensing means being a magnetic pick-up.

5. The apparatus of claim 4 wherein said removing means is an air hammer.

* * * * *